US011621617B2

(12) United States Patent
Ramet et al.

(10) Patent No.: US 11,621,617 B2
(45) Date of Patent: Apr. 4, 2023

(54) STATOR FOR A ROTATING ELECTRICAL MACHINE

(71) Applicant: Valeo Equipements Electriques Moteur, Creteil (FR)

(72) Inventors: Vincent Ramet, Étaples-sur-Mer (FR); Jean Duquesne, Étaples-sur-Mer (FR); Stéphane De Clercq, Étaples-sur-Mer (FR); Julien Pauwels, Étaples-sur-Mer (FR); Laurent Delassus, Étaples-sur-Mer (FR); Humberto Menezes, Étaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 209 days.

(21) Appl. No.: 16/761,885

(22) PCT Filed: Dec. 19, 2018

(86) PCT No.: PCT/EP2018/085937
§ 371 (c)(1),
(2) Date: May 6, 2020

(87) PCT Pub. No.: WO2019/121979
PCT Pub. Date: Jun. 27, 2019

(65) Prior Publication Data
US 2021/0234444 A1    Jul. 29, 2021

(30) Foreign Application Priority Data

Dec. 20, 2017  (FR) ..................... 1762642

(51) Int. Cl.
*H02K 15/00* (2006.01)
*H02K 15/06* (2006.01)
(Continued)

(52) U.S. Cl.
CPC ............ *H02K 15/064* (2013.01); *H02K 1/12* (2013.01); *H02K 3/12* (2013.01); *H02K 15/085* (2013.01)

(58) Field of Classification Search
CPC ............ H02K 3/487; H02K 3/28; H02K 3/24; H02K 3/18; H02K 3/12; H02K 3/50;
(Continued)

(56) References Cited

U.S. PATENT DOCUMENTS 6,717,317 B2 *  4/2004  Akita ................. H02K 15/0081
                                                            310/201
8,183,734 B2 *  5/2012  Saban .................... H02K 1/165
                                                            310/179
(Continued)

FOREIGN PATENT DOCUMENTS

CN    102545418 A     7/2012
CN    103339834 A    10/2013
(Continued)

OTHER PUBLICATIONS

The First Office Action issued in Chinese Application No. 201880078025.X, dated Dec. 2, 2021 (18 pages).
(Continued)

*Primary Examiner* — Phutthiwat Wongwian
*Assistant Examiner* — Sherman D Manley
(74) *Attorney, Agent, or Firm* — Osha Bergman Watanabe & Burton LLP

(57) ABSTRACT

The invention relates to a stator (2) comprising an annular body (4) having a side face (6) from which a plurality of radial teeth (8) extend, said teeth being angularly spaced in such a way as to define slots (10), and a plurality of conductive needles (15A, 15B), each conductive needle comprising two conductive segments (16A, 16B, 16C, 16D) connected by an elbow connector (18), the conductive (Continued)

segments being stacked one above the other in the slots (10) so as to form N layers which are parallel or substantially parallel to the side face (6) of the annular body. Each conductive needle (15A, 15B) comprises a conductive segment present in two separate slots, with one conductive segment present in a slot E in such a way as to occupy a layer ($C_i$) and another conductive segment present in a slot E+P in such a way as to occupy a layer ($C_{i+2}$), P being a pitch that is predetermined in a first direction of orientation.

14 Claims, 5 Drawing Sheets

(51) Int. Cl.
   *H02K 1/12* (2006.01)
   *H02K 3/12* (2006.01)
   *H02K 15/085* (2006.01)
(58) Field of Classification Search
   CPC .......... H02K 1/02; H02K 1/165; H02K 1/278; H02K 1/12; H02K 5/1285; H02K 15/12; Y10T 29/49009; Y10T 29/49012
   See application file for complete search history.

(56) References Cited

U.S. PATENT DOCUMENTS

| | | | |
|---|---|---|---|
| 9,136,738 B2 * | 9/2015 | Ikeda | H02K 3/28 |
| 10,461,591 B2 * | 10/2019 | Sakaue | H02K 15/085 |
| 2002/0017825 A1 * | 2/2002 | Oohashi | H02K 3/28 |
| | | | 310/207 |
| 2002/0047450 A1 * | 4/2002 | Asao | H02K 3/12 |
| | | | 310/184 |
| 2003/0011268 A1 * | 1/2003 | Even | H02K 9/06 |
| | | | 310/179 |
| 2006/0033394 A1 * | 2/2006 | Ogawa | H02K 3/12 |
| | | | 310/179 |
| 2010/0019610 A1 * | 1/2010 | Saban | H02K 1/02 |
| | | | 310/198 |
| 2013/0076188 A1 * | 3/2013 | Ikeda | H02K 3/28 |
| | | | 310/195 |
| 2018/0034351 A1 * | 2/2018 | Ramet | H02K 3/28 |
| 2020/0251968 A1 * | 8/2020 | Hino | H02K 15/062 |
| 2020/0259401 A1 * | 8/2020 | Baba | H02K 11/25 |
| 2020/0287447 A1 * | 9/2020 | Ciftcioglu | H02K 3/50 |
| 2021/0175764 A1 * | 6/2021 | Ramet | H02K 15/0414 |
| 2021/0184525 A1 * | 6/2021 | Hino | H02K 3/28 |
| 2021/0184532 A1 * | 6/2021 | Egashira | H02K 9/19 |

FOREIGN PATENT DOCUMENTS

| | | |
|---|---|---|
| CN | 203674840 U | 6/2014 |
| EP | 1107425 A2 | 6/2001 |
| EP | 2698901 A1 | 2/2014 |
| FR | 2808935 A1 | 11/2001 |
| FR | 2841701 A1 | 1/2004 |
| FR | 2846480 A1 | 4/2004 |
| JP | 2004-48967 A | 2/2004 |
| JP | 2014-79102 A | 5/2014 |
| JP | 2015-111975 A | 6/2015 |
| WO | 2015/072285 A1 | 5/2015 |

OTHER PUBLICATIONS

International Search Report and Written Opinion in corresponding International Application No. PCT/EP2018/085937, dated Feb. 22, 2019 (14 pages).
Notification of Reason for Rejection issued in corresponding Japanese Patent Application No. 2020-531954, dated Jun. 15, 2021 (15 pages).

* cited by examiner

STATOR FOR A ROTATING ELECTRICAL MACHINE

The present invention relates to a rotating electrical machine such as an alternator or an alternator-starter or a reversible machine or an electric motor for automobiles. The invention relates more particularly to a stator for a rotating electrical machine comprising a winding made of conductive pins.

A rotating electrical machine comprises a shaft integrally formed with a rotor and a stator arranged so as to surround the rotor. The rotor and the stator interact through a magnetic field. For this purpose, the rotor, for example, is provided with permanent magnets and the stator with an electric winding. Alternatively, the rotor could be a claw rotor formed by two polar wheels which can be provided with permanent magnets or otherwise. According to a first operating mode known as driving mode, the electric winding is supplied with electric current by an electronic module, so as to generate a magnetic field around the electric winding, in order to make the rotor rotate. According to a second operating mode known as generating mode, the rotor is rotated by the combustion engine of the vehicle, so as to generate a magnetic field around the electric winding of the stator which is fed with electric current by the electronic module.

The stator comprises a cylinder head forming a part revolving around an axis passing through the centre of the stator. The cylinder head comprises radial teeth, radially extending to the centre of the stator and around which the electric winding is formed. More particularly, the radial teeth define slots in which pass the conductive elements partaking in forming the winding of the stator.

The winding of the stator can be implemented in various ways, for example using a needle device to guide the winding of the same electric wire around each radial tooth to form successive coils. Nevertheless, this embodiment is difficult to implement as regards parameterising the passage of the needle guiding the electric wire through the slots. In particular, this embodiment is not feasible if the angular spacing between two radial successive radial teeth is insufficient to allow passage of the needle carrying the wire to be wound around the teeth.

To remedy this drawback, another method of winding consists in inserting a plurality of conductive pins in the slots defined by the radial teeth, then electrically connecting their ends together to form one continuous electric circuit. More precisely, each conductive pin comprises two conductive segments which are substantially parallel and connected by an elbow connector so as to form a "U". The conductive segments are inserted near a first axial end face of the stator, in two separate slots, so that the conductive segments are substantially parallel to the axis of revolution of the stator. Thus, in an advantageous way, it is not necessary to resort to a needle device as mentioned above. This operation is reproduced as many times as necessary to fill each slot with the same number of conductive segments and so that their elbow connectors project near the first axial end face of the stator. The loose ends of the conductive segments, exceeding a second axial end face of the stator, are then interconnected so as to form conductive circuits generating magnetic fields along the radial teeth when they are traversed by an electric current. In other words, the conductive pins are connected together so as to form various sets, each set in particular being able to correspond with an electric current. For example, in the case of an automotive alternator-starter, there are generally three different ways of supplying three-phase current to the winding. This embodiment enables the stator windings comprising radial teeth to be brought considerably closer in comparison to the preceding alternative. Nevertheless, it has proved necessary to use many connection parts between the conductive pins, so in particular ensuring that the electric current flows in the same direction in each segment present in the same slot of the stator.

The invention aims at proposing an original way to place conductive pins in the slots of a stator of a rotating electrical machine and to interconnect the conductive pins, so for example, without this being restrictive, decreasing the number of connection parts needed between the conductive pins to ensure the rotating electrical machine performs well.

The invention thus proposes a stator for a rotating electrical machine in the automotive field, comprising an annular body having a side face from which a plurality of radial teeth extend, said teeth being angularly spaced so as to define slots open on a first axial end face and on a second axial end face of the annular body and a stator winding comprising at least several conductive pins designed to extend at least partially in said slots and to be electrically interconnected, each conductive pin comprising two conductive segments connected by an elbow connector configured, so that the conductive segments of the same pin are arranged in two separate slots, the slots being filled by a plurality of conductive segments stacked one above the other so as to form N layers which are parallel or substantially parallel to the side face of the annular body.

The invention is notable in that each conductive pin comprises a conductive segment present in two separate slots, with a conductive segment present in a slot E so as to occupy a first layer $C_i$ and another conductive segment present in a slot E+P so as to occupy a distinct second layer $C_{i+2}$ and separated from the first layer by an intercalated layer, P being a pitch that is predetermined in a first direction of orientation.

In other words, the conductive pins are each assembled in two separate slots by inserting a segment in a respective slot, so that the conductive segments of the same conductive pin occupy two different slots of the annular body. And the conductive segments of the same pin are located on distinct layers and separated by only one intercalated layer formed by a conductive segment of another conductive pin. The inventors noted that this embodiment advantageously enables the number of connection parts needed between the conductive segments to ensure that the electric current flows in the same direction in each slot of the stator to be reduced. Thus this allows the footprint of the chignon to be decreased by reducing the number of winding elements and thus the manufacturing process of the winding to be simplified. Moreover, this enables the electromagnetic losses to be reduced.

According to a feature of the invention, the elbow connectors of adjacent conductive pins are substantially parallel near the first axial end face. In other words, the elbow connectors form a chignon near the first axial end face without crossing over one another. So the height of the chignon is reduced because it is not necessary to superimpose the elbow connectors to allow their conductive segments to be placed in the slots. In other words, it is not necessary to raise a first elbow connector to let a second elbow connector pass between the first elbow connector and the first axial end face of the stator. The term "height" is here understood to mean a substantially normal direction near the first axial end face.

It is understood that a pin winding, when it facilitates the installation of the winding around the teeth of the stator, involves connections between the pins and electric connection elements to ensure that the direction of the current traversing these pins is coherent over the total circumference of the stator. Each pin arrangement and the position which results therefrom in the stator makes a layer shift when it passes from one slot to another. It is advantageous according to the invention not to have internal pins and external pins arranged in two separate concentric loops, but pins which nest in each other in order to facilitate the flow of the current in each winding layer by limiting the number of connections between the pins.

Thus, the fact of shifting the conductive segments of the same conductive pin of more than one layer between two slots allows this mixing, or nesting, of the internal and external pins, and the fact of shifting the conductive segments of the same pin with only two layers makes it possible to prevent the pins from having to be superimposed and thus allows the axial footprint of the stator and its winding to be limited.

It should be noted that, according to the invention, a different number of layers is associated with each conductive segment present in the same slot. More precisely, in the same slot, a number increasing from the periphery to the centre of the stator is associated with each layer formed by the conductive segments. According to this example, thus number 1 is associated with the most external conductive segment, i.e. nearest the side face of the stator and the number N with the most internal conductive segment, i.e. furthest away from the side face of the stator.

According to a feature, the loose end, i.e. the end which emerges near the second axial end face of the annular body, of a conductive segment of a pin occupying the layer Ci in a slot is connected, near the second axial face of the annular body, to the loose end of a conductive segment of an adjacent pin occupying the layer Ci+1 in a separate slot with a pitch P.

According to a feature, each slot comprises an even number of conductive segments. In particular, each slot E can comprise a number N of layers which, for example, is equal to four.

In this case of four layers of segments stacked in the same slot, it is therefore notable that:
  the pins are arranged so that one of their conductive segments extends so as to occupy the first layer in a slot E and so that their other conductive segment extends so as to occupy the third layer in a slot E+P, or so that one of their conductive segments extends so as to occupy the second layer in a slot E and so that their other conductive segment extends so as to occupy the fourth layer in a slot E+P,
  the loose end, i.e. the end which emerges near the second axial end face of the annular body, of a conductive segment occupying the first layer in a slot E is connected to the end of a conductive segment occupying the second layer in a slot E+P, while the loose end of a conductive segment occupying the third layer in a slot E is connected to the end of a conductive segment occupying the fourth layer in a slot E+P.

According to a feature, a first type of pins is such that the loose ends of the conductive segments, connected by an elbow connector, near the second axial end face are closer than their conductive segments are thereto. In particular, in the case of a winding with four layers of conductive segments stacked in the same slot, this first type of pins can correspond to a first set of pins known as external set, with the pins arranged in the stator so that one of their conductive segments is placed in the external layer of the corresponding slot.

According to a feature, a second type of pins is such that the loose ends of the conductive segments, connected by an elbow connector, near the second axial end face are more distant than their conductive segments are thereto. In particular, in the case of a winding with four layers of conductive segments stacked in the same slot, this second type of pins can correspond to a second set of pins known as internal set, with the pins arranged in the stator so that one of their conductive segments is placed in the internal layer of the corresponding slot.

In other words, at least two sets of conductive pins are used to implement the winding of the stator. Thus the winding comprises a first set of conductive pins in which the loose ends of the conductive segments are closer than said segments placed in their respective slot, and a second set of conductive pins in which the loose ends of the conductive segments are more distant than said segments in their respective slot. The first set of conductive pins in particular forms an external set, a conductive segment of each pin of this first set being placed in a slot so as to form part of the first layer, and the second set of conductive pins forms an internal set, a conductive segment of each pin of this second set being placed in a slot so as to form part of the last layer.

In the case of application where the slots comprise four layers of conductive segments stacked one above the other, the external set is such that the pins have conductive segments occupying the first and third layers while the internal set is made up of pins whose conductive segments occupy the second and fourth layers.

According to an alternative feature, the first set of conductive pins can in particular form an internal set, a conductive segment of each pin of this first set being placed in a slot so as to form part of the last layer, and the second set of conductive pins can form an external set, a conductive segment of each pin of the second set being placed in a slot so as to form part of the first layer. In the case of application where the slots comprise four layers of conductive segments stacked one above the other, the external set is such that the pins have conductive segments occupying the first and third layers while the internal set is made up of pins whose conductive segments occupy the second and fourth layers.

According to a feature, at least one electrical terminal lug is arranged between two separate slots with a predetermined pitch P, the lug having two additional conductive segments occupying the same layer in each of these two slots and a connection part connecting these two additional conductive segments near the first axial end face of the annular body. The arrangement of the conductive pins, namely on the one hand their nesting in each other and on the other hand the alternation of forms near the second axial end face, advantageously enables recourse to the use of electric connections to be limited in order to ensure continuity of the electric path or electrical circuit formed by the conductive segments described above, and ensure the orientation of the alternate current from one slot to another.

Such a connection lug also makes it possible to distance the conductive segments which are connected to a power source from one another. Thus this makes it possible to simplify the step of connection between said conductive segments and the power source by increasing the space between said conductive segments in order to simplify the passage of the connection tools.

According to a feature, the electrical terminal lug is configured so that its additional conductive segments are placed in two separate slots near the first layer.

According to an alternative feature, the electrical terminal lug is configured so that its additional conductive segments are placed in two separate slots near the last layer. For example, if one slot comprises four layers of conductors, its additional conductive segments are placed in the fourth layer.

According to a feature compatible with the two alternatives mentioned above, the connection part of the electrical terminal lug is radially shifted relative to the elbow connectors of the conductive pins, so that the electrical terminal lug circumvents said elbow connectors.

According to an alternative embodiment compatible with the two alternatives mentioned above, the electrical terminal lug can be configured so that the connection part passes above the elbow connectors present near the first axial end face of the stator.

According to another alternative feature, at least one electrical connection lug is arranged between two separate slots with a predetermined pitch P, the lug having two additional conductive segments occupying a different layer in each of these two slots and a connection part connecting these two additional conductive segments near the first axial end face of the annular body.

According to a feature of this alternative, the electrical terminal lug is configured so that its additional conductive segments are placed in two separate slots while being placed in two successive separate layers. For example, if a slot comprises four layers of conductors, its additional conductive segments are placed in the second and the third layer.

According to a another version of this alternative, the electrical connection lug is configured so that its additional conductive segments are placed in two separate slots while being placed in two distinct layers and separated by at least one intercalated layer. For example, if a slot comprises four layers of conductors, its additional conductive segments are placed in the first and fourth layer.

According to a feature, in two separate slots with a predetermined pitch P, conductive segments occupying one of the layers are connected to a source of power near the first axial end face of the annular body, allowing several conductive segments connected in series to be supplied with a phase current. This embodiment advantageously makes it possible to connect various power sources to conductive segments always occupying the same layer in the slots. In this way connections between the power sources and the conductive elements are more easily made.

According to a feature, said conductive segments connected to a power source are placed in a central layer, i.e. the second or third layer and more particularly the third layer.

According to a feature, the electrical terminal lug is configured so that its additional conductive segments are placed in two separate slots while being placed in two distinct layers and separated from one another by at least one intercalated layer and the conductive segments connected to a power source are placed in a central layer forming the intercalated layer. This configuration of the stator allows better resistance to vibration of the conductive segments connected to a power source. Indeed in this configuration, said conductive segments connected to a power source are less sensitive to vibration because they are surrounded at least partially by the connection lug.

For example, the electrical terminal lug is configured so that its additional conductive segments are arranged in two separate slots while being placed in two distinct layers and separated from one another by two intercalated layers.

According to an alternative feature, said conductive segments connected to a power source are placed in a curb layer, i.e. the first or fourth layer.

According to a feature, in two separate slots with a predetermined pitch P, conductive segments occupying one of the layers are interconnected near the first axial end face of the annular body, allowing the current phases to be connected according to the desired coupling.

According to a feature, said connected conductive segments making it possible to produce the coupling are placed in a central layer, i.e. the second or third layer and more particularly the third layer.

According to an alternative feature, said conductive segments making it possible to produce the coupling are placed in a curb layer, i.e. the first or fourth layer.

According to a feature, the electrical terminal lug forms a serial connection between two winding portions.

Of course, the various features, alternatives and embodiments mentioned above can be associated with each other in various combinations, insofar as they are not incompatible or exclusive from/to each other.

The invention also relates to a rotating electrical machine for automobiles comprising a stator as described above. The rotating electrical machine can form an alternator or an alternator-starter or a reversible machine or an electrical motor.

The invention will be better understood, by virtue of the description hereafter, which refers to the preferred embodiments, given as non-restrictive examples, and explained with reference to the appended schematic drawings, in which.

Figure 1:
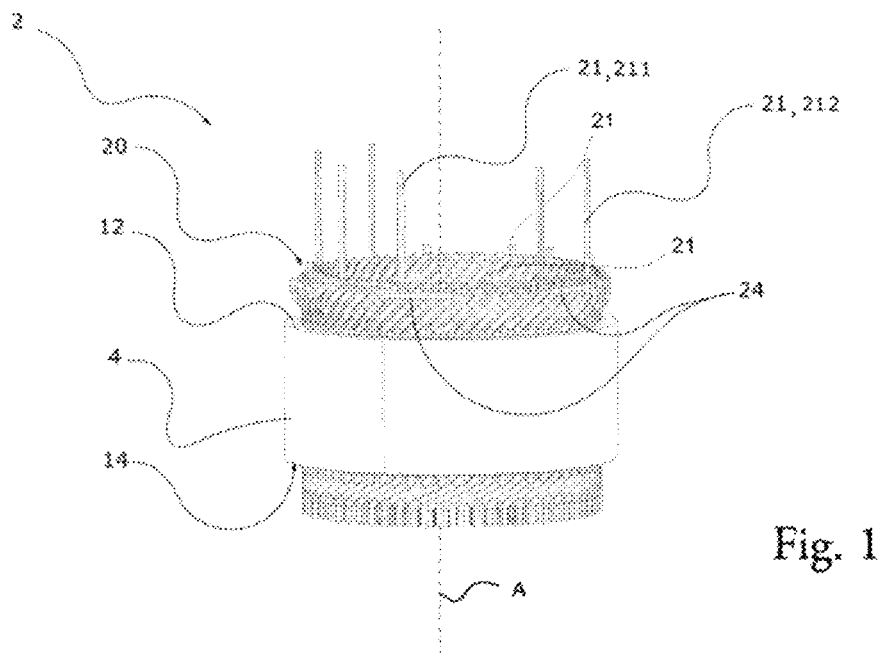
FIG. 1 illustrates a perspective view of a stator provided with a winding and forming part of an electrical machine according to a first embodiment of the invention.
Figure 6:
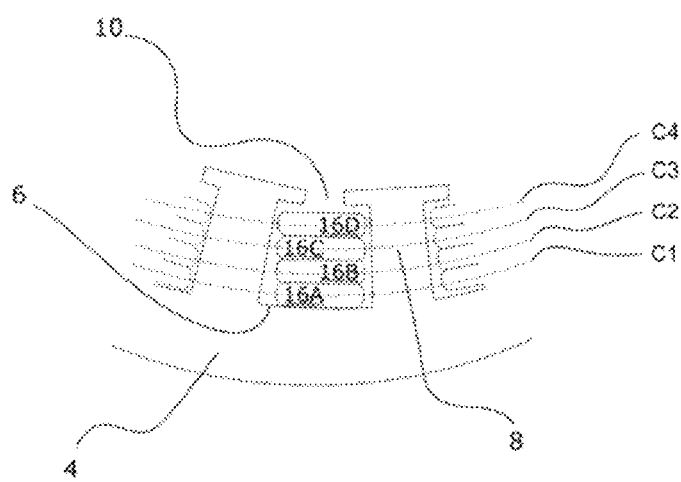
Figure 8:
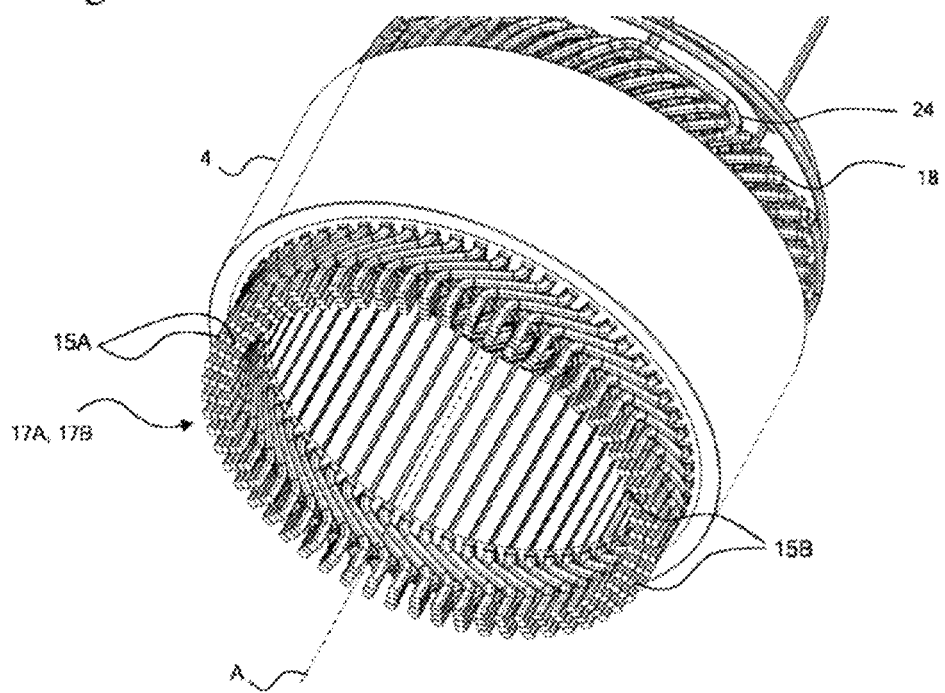
Figure 7:
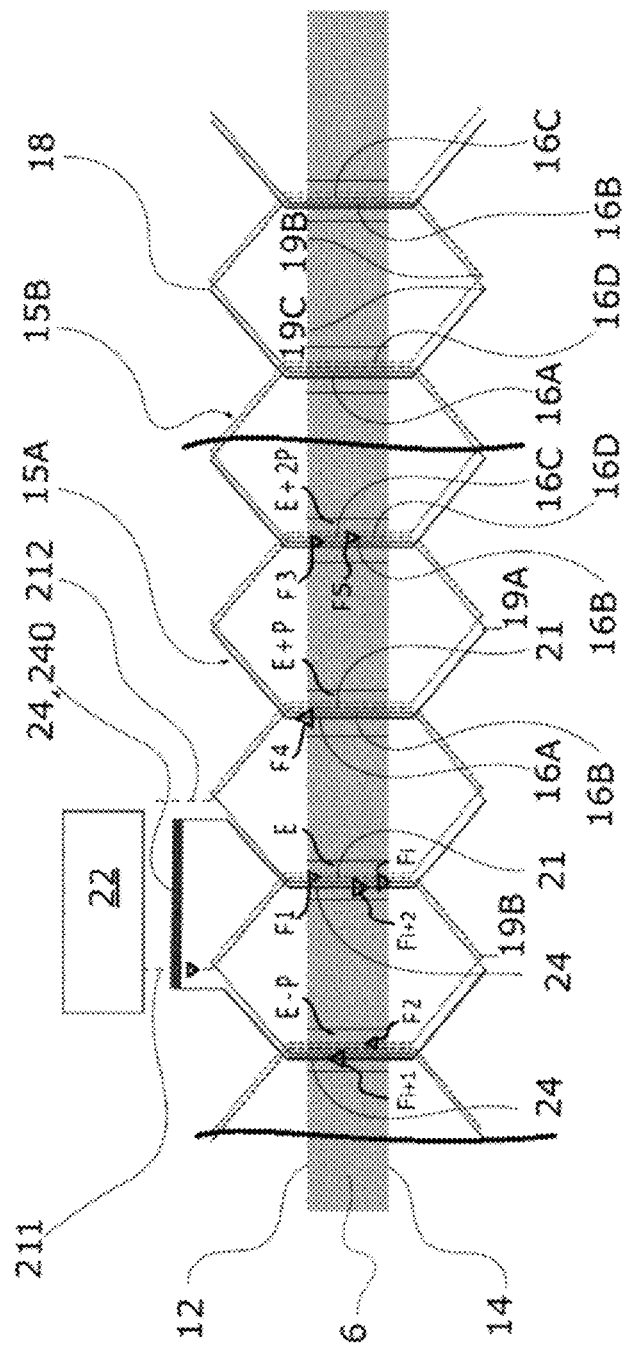

FIG. 6 schematically illustrates a slot of a stator forming part of a rotating electrical machine according to the invention, in order to show the successive layers, here four, of conductive segments stacked in said slot so as to form part of the winding;

FIG. 7 is a diagram representing the arrangement of conductive pins passing in slots of a stator as illustrated on the preceding figures, and whose interconnection enables part of the winding of a stator of a rotating electrical machine according to the invention to be formed;

FIG. 8 illustrates the stator of FIG. 1 according to a different perspective angle in particular showing the loose ends of the conductive pins partaking in forming the winding.

Figure 9A:
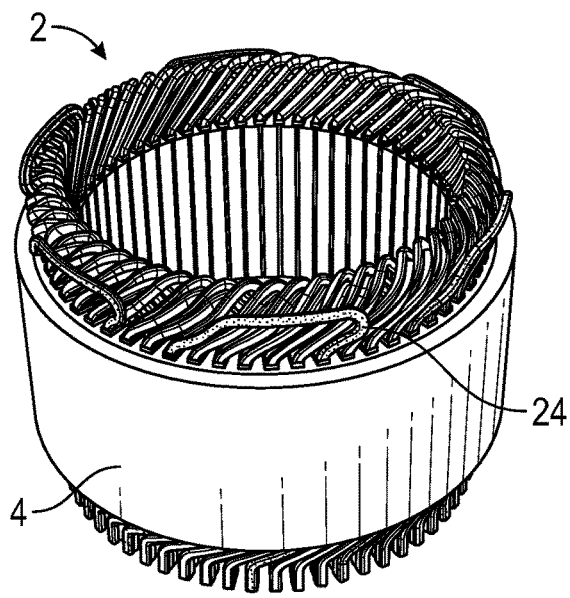

FIG. 9A shows a stator in accordance with one or more embodiments.

Figure 9B:
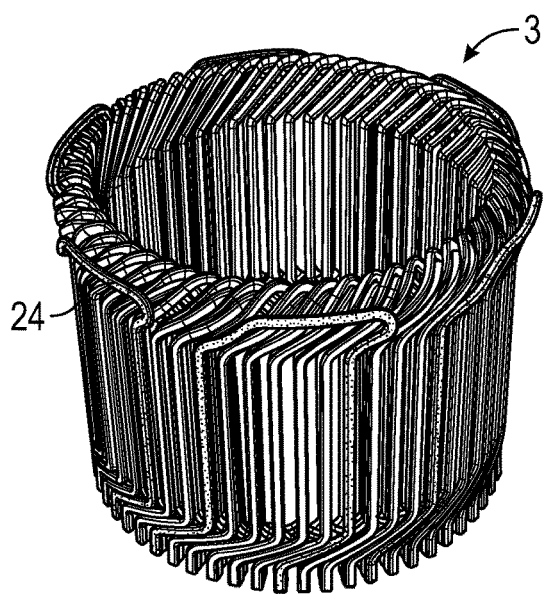

FIG. 9B shows a stator winding in accordance with one or more embodiments.

Figure 9C:
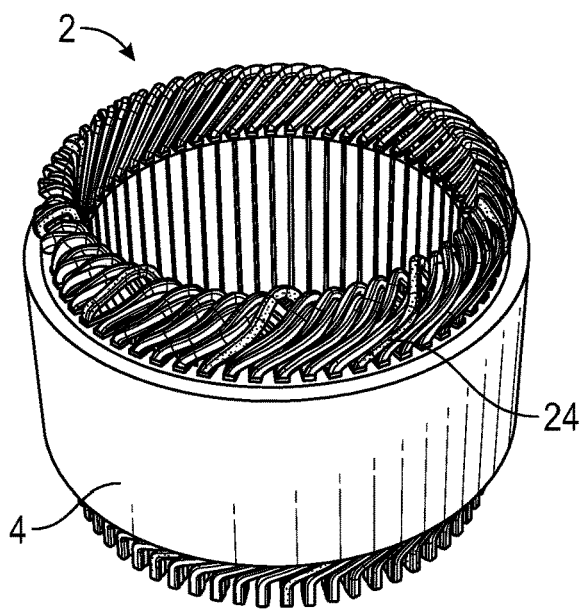

FIG. 9C shows a stator in accordance with one or more embodiments.

Figure 9D:
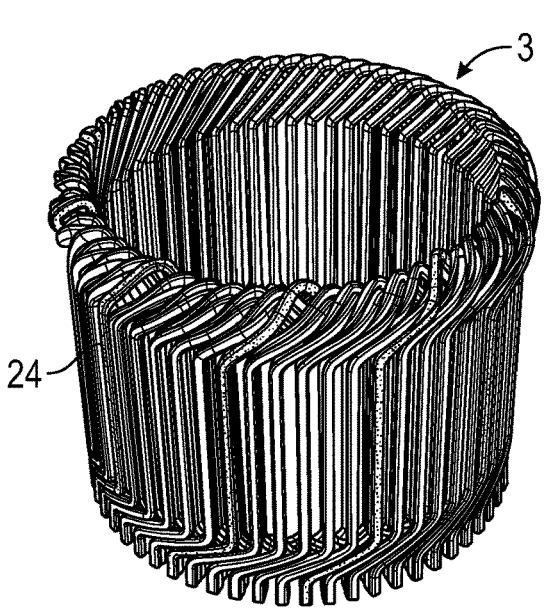

FIG. 9D shows a stator winding in accordance with one or more embodiments.

Figure 9E:
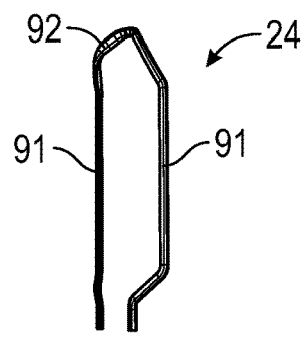

FIG. 9E shows a connection lug in accordance with one or more embodiments.

To recap, the invention aims at proposing an original way to arrange conductive pins in the slots of a stator of a rotating electrical machine and to interconnect the conductive pins, so for example, without this being restrictive, decreasing the number of connection parts needed between the conductive pins to ensure the rotating electrical machine performs well.

Figure 2:
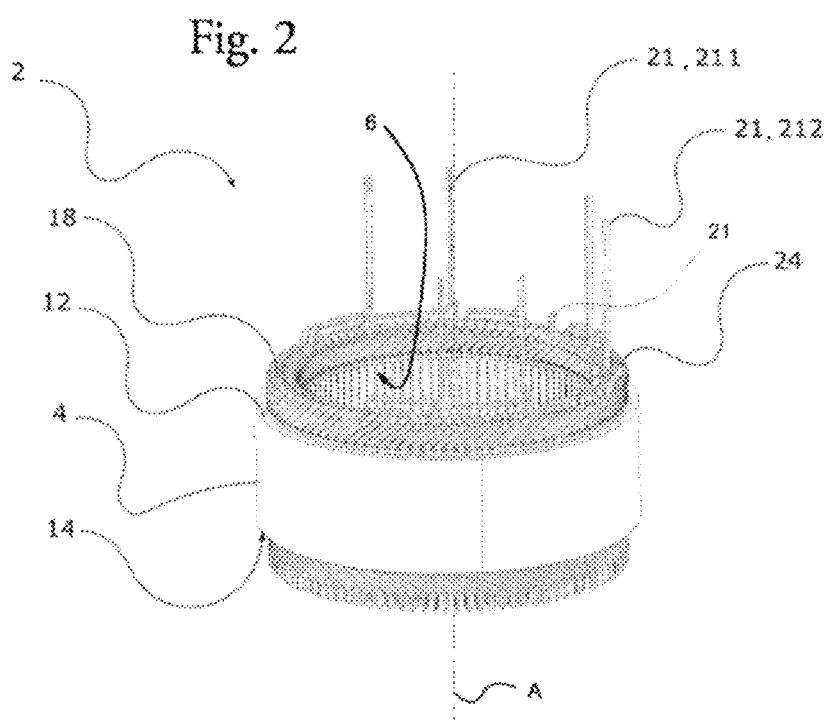
FIG. 2 illustrates a stator forming part of an electrical machine according to a second embodiment of the invention and its associated winding.

FIGS. 1 and 2 illustrate a stator 2 for a rotating electrical machine configured to form an alternator or alternator-starter or reversible machine or electrical motor for an automobile. The stator in particular comprises an annular body 4 forming a cylinder head revolving around an axis of revolution A.

This axis of revolution substantially corresponds to the axis of rotation of a rotor, not illustrated, in this case designed to rotate inside stator 2.

Annular body 4 comprises a side face 6 (visible in particular on FIGS. 2, 5 and 6) directed to the interior of the stator, so as to define an internal wall of the cylinder head. The annular body 4 in addition comprises several radial teeth 8 which extend, projecting from side face 6, in the direction of the centre of the stator. The radial teeth 8 are distributed angularly regularly over the circumference of the annular body, with the successive spaces arranged in-between so as to define slots 10 extending in series over the circumference of the annular body of the stator, each slot being defined by two successive radial teeth 8.

According to the axial direction, i.e. the direction parallel to the axis of revolution A of the stator, slots 10 are open over a first axial end face 12 and a second axial end face 14 of the annular body. In other words, slots 10 axially pass right through the annular body 4 and lead to both opposite axial end faces of the stator. The term "axial end faces" is understood to mean faces which are normal or substantially normal to the side face 6 and the axis of revolution A of the stator.

According to this example, radial teeth 8 define 96 slots distributed on side face 6, being understood that, as will be described hereafter, these slots are arranged to support a stator winding. Alternatively a different number of slots such as 84, 72, 60, 48 slots can be used. It is understood that this number depends on the application of the machine, the diameter of the stator and the number of poles of the rotor.

Figure 3:
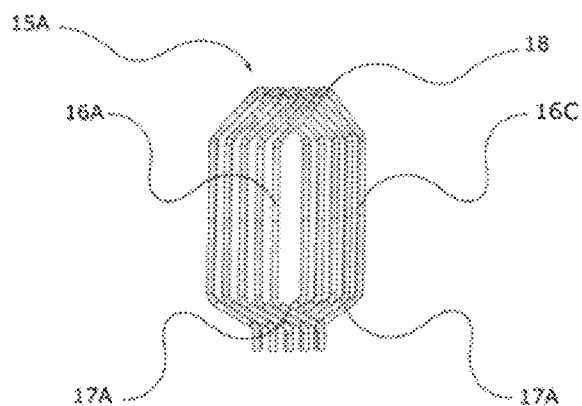
FIG. 3 illustrates a perspective view of a set of a first type of conductive pin used to implement a winding according to the invention.
Figure 4:
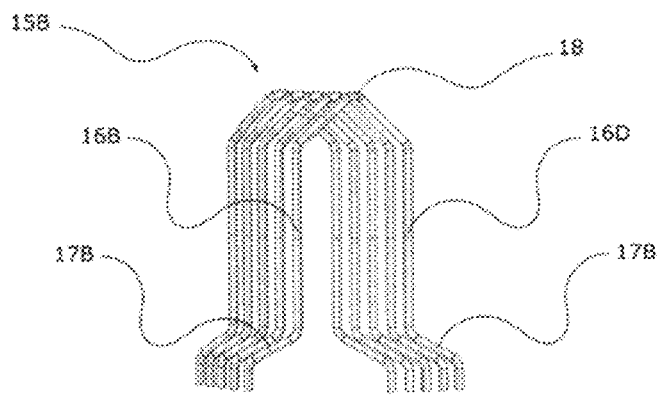
FIG. 4 illustrates a perspective view of a set of a second type of conductive pin used to implement a winding according to the invention.

The winding is formed from a plurality of sets of conductive pins 15A and 15B, these sets being illustrated respectively on FIGS. 3 and 4. Each conductive pin suitable for forming one or other of the sets comprises two conductive segments 16A, 16B, 16C, 16D arranged to extend axially in the slots and which for this purpose are substantially parallel to one another. In the example illustrated, and as in particular shown on the schematic illustration of FIG. 6, the conductive segments have a substantially rectangular section which facilitates their stacking in the slot. As well for the pins of the first sets, as illustrated on FIG. 3 as well as for the pins of the second sets, as illustrated on FIG. 4, the conductive segments are interconnected by an elbow connector 18 which is also conductive so as to ensure electrical continuity. These conductive segments 16A, 16B, 16C, 16D are superimposed in slots 10 of stator 2, as illustrated by FIG. 6, in order to form a stack of N layers Ci, being understood that these N layers are present in each slot so that over the circumference of the stator, layers which are substantially coaxial to side face 6 of the annular body are formed.

According to this exemplary embodiment, these four winding layers are numbered C1 to C4, according to their order of stacking in slots 10. The first layer C1 corresponds to the external layer, the second layer C2 corresponds to an external central layer directly adjacent to the first layer C1, the third layer C3 corresponds to the internal central layer directly adjacent to the second layer C2 and the fourth layer C4 corresponds to the internal layer. The first layer C1 is thus occupied by the conductive segment nearest to annular body 4 of the stator. Of course, the invention is not limited to the single embodiment so that a higher number of conductive segments can be stacked in each slot 10, for example 6, 8 or 10 conductors.

The conductive pins forming the first or second set of pins are characterized by the loose end of the conductive segments, opposite elbow connector 18.

The conductive pins 15A forming the first set of pins are characterized by two loose ends 17A of conductive segments which are curved so they are brought closer to one another.

More particularly, loose ends 17A of the conductive segments are folded up so that they overlap one another.

The conductive pins 15B forming the second set of pins are characterized by two loose ends 17B of conductive segments which are curved so they diverge from one another. The spacing between two loose ends of the conductive segments of the same pin is larger than the spacing between these two conductive segments in their straight portion placed in the slots. More particularly, the conductive segments of the same pin are spaced with a pitch P so as to be inserted respectively in a slot E and in a slot E+P, and the loose ends of these conductive segments are spaced with a pitch 2P.

As shown on FIGS. 1 and 2 and FIG. 7 in particular, each conductive pin 15A and 15B is arranged so that on the one hand its conductive segments extend in two separate slots E and E+P, separated by a pitch P, and so that in addition each elbow connector 18 is arranged near first axial end face 12 while loose ends 17A and 17B are arranged near second axial end face 14 and are interconnected so as to ensure electric continuity in the winding from one pin to another. As will be described hereafter in particular with reference to FIG. 7, the loose ends of conductive segments 16A arranged in a first layer C1 and the loose ends of conductive segments 16B arranged in a second layer C2 are interconnected and the loose ends of conductive segments 16C arranged in a third layer C3 and the loose ends of conductive segments 16D arranged in a fourth layer C4 are interconnected.

The two sets of pins form a first set known as external set, which comprises the pins whose conductive segments are placed in the slots so as to form the first external layer and a second set known as internal set, which comprises the pins whose conductive segments are placed in the slots so as to form the fourth internal layer.

The two sets of pins are nested in each other, i.e. arranged so that one of the conductive segments of the pins of the external set is located in slots inside one of the conductive segments of the pins of the internal set. More particularly, a conductive pin 15A pertaining to a first set known as external is arranged in the stator so as to have a conductive segment 16A occupying a first layer C1 in a slot E and a conductive segment 16C occupying a third layer C3 in a slot E+P. And a conductive pin 15B pertaining to the second set known as external is arranged in the stator so as to have a conductive segment 16B occupying a second layer C2 in the slot E and a conductive segment 16D occupying a fourth layer C4 in a slot E+P. In other words, the conductive pins are arranged so that the conductive segments of the same conductive pin occupy separate slots with radial shifting of two layers from one slot to the other, or in other words with the interposition of an intermediate layer between the two layers occupied by the conductive segments of this same pin. This radial shifting corresponds to the interposition of a conductive segment pertaining to a conductive pin of the other set. Particular advantages of electric connection result from this particular arrangement of the winding which will be described hereafter as well as an alignment of elbow connectors 18 near first axial end face 12 of stator 2 as illustrated on FIGS. 1 and 2, so that adjacent elbow connectors are substantially parallel to each other.

It will be described below and in particular with reference to FIG. 7 how the pins are interconnected to form the winding of the stator, with in particular, near the second axial end face 14 of stator 2, a loose end 17 of a conductive pin and another loose end of another conductive pin which are connected together to form continuous electrical circuits or conductive paths generating or receiving magnetic fields along the radial teeth, when they are traversed by an electric current.

Previously, it should be noted that the arrangement of elbow connectors 18 near first axial end face 12 of stator 2 is such that the conductive pins do not nest in each other, which allows a chignon 20 which is low in height to be formed. The term "height" is understood to mean a normal direction or substantially near first axial end face 12, i.e. a direction parallel to the axis of revolution A.

Each elbow connector 18 can be formed by a single conductor so that an elbow connector, two conductive segments and two loose ends of the same pin are formed by only one electric conductor which extends particularly in a U-shape. Alternatively, each elbow connector 18 can be formed by two ends connected together. Thus, an elbow connector, two conductive segments and two loose ends of the same pin are formed by two conductive bars connected together.

Additional electric connection elements are also provided to complete the electrical circuit and to allow a suitable circulation of current through the winding, in particular so that on the one hand the current flows in the same direction in each conductive segment placed in the same slot, and that on the other hand the current flows in a general way in one direction in a slot and in the opposite direction in the slots spaced with a pitch P and –P.

These additional components comprise in particular electrical terminal lugs 24, which are respectively made of a connection part 240, arranged on the side of first axial end face 12 of the stator, and of two additional conductive segments each arranged in a slot so that the connection part connects in a way equivalent to the elbow connector of the pins described previously. These additional components are specific in that the conductive segments which they comprise occupy the same layer in each of the two slots, and more particularly in the illustrated example the first layer C1.

Figure 5:
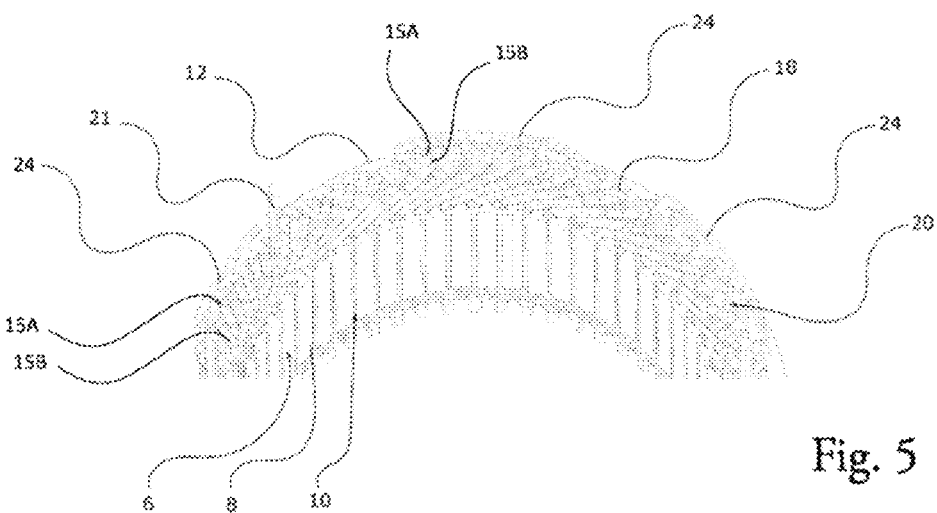
FIG. 5 illustrates a perspective view of part of the stator illustrated on FIG. 1.

As in particular shown on FIGS. 1, 2 and 5, this position of the additional conductive segments in the first layer C1 allows a connection part to circumvent the elbow connectors of the conductive pins, connection part 240 being radially shifted to the outside of the stator, i.e. without penalizing the axial dimension of the rotating electrical machine and without obstructing the movement of the rotor in relation to the stator.

It is understood that without leaving the context of the invention, it can be selected so that the connection part is arranged above the elbow connectors of the corresponding conductive pins, in particular so that footprint constraints are greater as regards the radial dimensions than as regards the axial dimensions, given that the position of this electrical connection lug is in the first layer C1, made possible by the nesting of the conductive pins and the mixture which results therefrom between the pins known as internal and the pins known as external, enables the orientation of the connection part and the footprint which results therefrom to be selected according to the rotating electrical machine in which this winding is installed.

This way, and as illustrated on FIG. 1, a first embodiment of a stator and the associated winding composed of pins which are nested in one another is such that electrical connection lug 24 axially does not exceed chignon 20 formed by elbow connectors 18, thus limiting the longitudinal footprint of the stator in an automotive rotating electrical machine for example, while as illustrated on FIG. 2, a second embodiment is such that electrical terminal lug 24 exceeds elbow connectors 18 so as to pass over the latter, in order to limit the radial footprint of the stator, in particular in a rotating electrical machine of less power, the smallest axial dimension of the pins in such a machine of less power allowing this axial excess.

In other words, electrical terminal lug 24 is comparable to another type of conductive pin comprising two conductive segments distant from each other so as to form part of separate slots with a pitch P, near the same layer and in this case the first layer known as external. This electrical connection lug 24 is positioned near the peripheral layer of the winding in order to replace the conductive segments 16A of two conductive pins 15A pertaining to the first set. An example is provided in FIGS. 9A and 9B.

In an alternative embodiment which is not illustrated, these additional conductive segments can occupy the fourth layer C4. The first and second embodiments described above can apply in the same manner when said segments are placed in the fourth layer C4.

In another alternative embodiment which is not illustrated, these additional conductive segments can occupy separate layers such as the second layer C2 and the third layer C3. In this case, the connection part of the electrical connection lug is inserted circumferentially between the elbow connectors of the other conductive pins.

In yet another alternative embodiment which is not illustrated, these additional conductive segments can occupy separate layers such as the first layer C1 and the fourth layer C4. In this case, the connection part of the electrical connection lug extends partly to the top, in an axial direction, of certain elbow connectors of the other conductive pins. An example is provided in FIGS. 9C and 9D. Further, an example of a single electrical terminal lug 24 is shown in FIG. 9E. The terminal lug 24 includes conductive segments 91 and a connection part 92. Six of the electrical terminal lugs 24 of FIG. 9E may be used in the embodiment shown in FIGS. 9C and 9D.

Conductive elements 21, forming phase current inputs and outputs, are arranged in the third layer of the slots which could be occupied by a conductive pin segment if an electrical terminal lug 24 were not arranged in its place. In other words, for each additional conductive segment of an electrical terminal lug occupying a first layer C1 in a slot E, a conductive segment is provided to occupy a third layer C3 in a slot E+P spaced with a pitch P.

It is understood that a pair of conductive segments 21 is associated with each electrical connection lug 24 and, as shown on FIG. 2 in particular, six pairs of these conductive segments 21 are prolonged axially to form phase current inputs and outputs 211, 212, supplied with a first phase electric current by a power source 22 illustrated schematically on FIG. 7. These phase current inputs and outputs are configured according to the invention to engage in the slots near the third layer C3. More precisely, half of these phase current inputs and outputs are connected, directly or via an interconnection device, to a power source 22, the other half being connected, directly or via an interconnection device, to an input and output of another phase current in order to create the electric coupling.

Alternatively, when each additional conductive segment of an electrical terminal lug occupies a fourth layer C4 in a slot E, a conductive segment 24 is provided to occupy a second layer C2 in a slot E+P spaced with a pitch P.

Again alternatively, if each additional conductive segment of an electrical terminal lug occupies a second layer C2 or a third layer C3 in a slot E, a conductive segment is provided to occupy a first layer C1 and a fourth layer C4 in a slot E+P spaced with a pitch P.

Still alternatively, when each additional conductive segment of an electrical terminal lug occupies a first layer C1 or a fourth layer C4 in a slot E, a conductive segment is provided to occupy a second layer C2 and a third layer C3 in a slot E+P spaced with a pitch P. A schematic illustration of a winding part formed by the connection of nested conductive pins, in accordance with what has been described previously, is shown on FIG. 7. To simplify comprehension, the number of slots and sets of pins has been limited, given that what follows could be understood without difficulty by the person skilled in the art to implement the complete winding, the other slots of the stator also comprising stacks of conductive segments. According to this example, stator 2 comprises 96 slots each containing 4 stacked conductive segments. The skilled person will understand that the example of FIG. 7 illustrates the case where additional conductive segments of the electrical connection lugs occupy the first layer C1 in a slot E and the conductive segments forming the phase current inputs and outputs occupy the third layer C3 but this applies in a similar way to the other exemplary embodiments previously described.

More precisely, for the electrical circuit illustrated on FIG. 7, the current is introduced into the winding via the phase current input 211. Its passage will be described more in detail via the numbered arrow F1 to illustrate the fact that the current flows, in stacked segments, in the same direction for a given slot, and in an opposite direction for a slot spaced with a pitch P or −P.

It should be noted that slot E+P is very distant from the slot E with a predetermined pitch P, in a first direction of orientation. According to this example, the pitch P corresponds to the interposition of five slots between a slot E and E+P, and the first direction of orientation is in the opposite direction to the hands of a watch.

The current flows in conductive segment 21 placed in a slot E, in the prolongation of phase current input 211 (F1 arrow). This conductive segment 21, arranged so as to form part of the third layer C3 in this slot E, at its loose end, on the side of the second axial end face 14, has a shape which is folded up on itself similar to that of a conductive segment 16C of a pin known as external which it replaces in this layer.

The loose end of this conductive segment 21 is connected, near second axial end face 14 of the stator, to the loose end 17B of a conductive segment 16D occupying the fourth layer C4 in a slot E−P, the two loose ends, arranged next to one another as shown more particularly on FIG. 8, of these conductive segments 21,16D being connected electrically near a point of contact 19B. This results in that the current is made to flow from second axial end face 14 to first axial end face 12 in the fourth layer C4 of slot E−P, as illustrated by the F2 arrow.

The conductive segment 16D, occupying the fourth layer C4 in slot E−P, forms part of a conductive pin 15B pertaining to a second set of pins known as internal set such as described previously, so that this conductive segment is prolonged, near first axial end face 12 of the stator, via an elbow connector 18, in conductive segment 16B occupying the second layer C2 in a separate slot with a space P, in the opposite direction to the first direction of orientation.

It is understood that for a given phase, the pins are successively nested over the total circumference of the stator, and to simplify comprehension of FIG. 7, reference should again be made to the above description according to which the current makes the stator to substantially rotate, by regarding the solid line which is placed horizontally near slot E+2P on this FIG. 7.

At this stage, the current is made to flow from first axial end face 12 to second axial end face 14, in the second layer C2 of slot E+2P, as illustrated by the F3 arrow.

As illustrated by FIG. 7, loose ends 17A and 17B of conductive segments 16 are interconnected near second axial end face 14 of the stator, so as to allow an electric current to flow through said segments in the same direction in each slot. The direction of the current is illustrated by the arrows straddling the conductive pins.

The winding is continued by then connecting the end of conductive segment 16B occupying the second layer C2 in slot E+2P to the end of a conductive segment 16A occupying the first layer C1 in slot E+P, the loose ends of these conductive segments being arranged next to one another as shown on FIG. 8 and connected electrically by a point of contact 19A near second axial end face 14.

At this stage, the current is made to flow from second axial end face 14 to first axial end face 12, in the first layer C1 of slot E+P, as illustrated by the F4 arrow.

The conductive segment 16A, occupying the first layer C1 in slot E+P, forms part of a conductive pin 15A pertaining to a first set of pins known as external set as described previously, so that this conductive segment is prolonged near first axial end face 12 of the stator, via an elbow connector 18, in a conductive segment 16C occupying the third layer C3 in a separate slot with a space P, in the first direction of orientation.

This means that the current is made to flow from first axial end face 12 to second axial end face 14, in the third layer C3 of slot E+2P, as illustrated by the F5 arrow.

It is noted as above that in slot E+2P, the currents flowing in the second layer C2 and the third layer C3 layer both flow in the same direction.

The winding is continued, in accordance with what has just been described, by passing from a conductive segment of the first layer C1 to the third layer C3 and fourth layer C4 to the second layer C2 on the side of the elbow connectors forming part of the conductive pins, and by passing from the second layer C2 to the first layer C1 and from the third layer C3 to the fourth layer C4 by electric bridges, in particular weldings, near the second axial end face 14, so that the current flows in the same direction in each slot.

In the example illustrated, after the power has been transmitted, in the direction of the Fi arrow, in the second layer C2 of slot E, from first axial end face 12 to second axial end face 14, the power is transmitted from a conductive pin 15A pertaining to a first set of pins known as external set to an electrical connection lug 24 as described above. This means that the power is successively transmitted in a direction (Fi+1) then in the other direction (Fi+2) in a first layer C1 of a slot E−P and in a first layer of a slot E. The current is then made to flow, in accordance with what was described previously, from one conductive pin to another, until circulating in slot E+P near the third layer in which the conductive segment is connected to the phase current output 122.

As stated previously, the connections between the various conductive segments described above are reproduced over the total circumference of the stator so as to form the same arrangement of conductive segments in the various slots of this stator.

The above descriptions facilitates, here in the case of a winding with four layers of conductive segments stacked in the slots of the stator, comprehension of the interest in having pins nested according to the invention, with conductive pins which each have conductive segments arranged respectively in layers Ci and Ci+2. This arrangement in particular allows electric connection of the set to be simplified, by decreasing the elements which are ancillary to the pins, namely connections of one layer to the other and the electrical terminal lugs.

This description is given using the example of a three-phase double machine but the invention also applies to other types of machine such as a three-phase machine.

The invention claimed is:

1. A stator for a rotating electrical machine, comprising:
an annular body having a side face from which a plurality of radial teeth extend, said teeth being angularly spaced in such a way as to define slots, open on a first axial end face and on a second axial face of the annular body; and
a stator winding comprising at least several conductive pins configured to extend at least partially in said slots and electrically interconnected, each conductive pin comprising two conductive segments connected by an elbow connector configured so that the conductive segments of the same pin are arranged in two separate slots, the slots being filled by a plurality of conductive segments stacked one above the other so as to form N layers parallel or substantially parallel to the side face of the annular body,
wherein each conductive pin comprises a conductive segment present in two separate slots, with a conductive segment present in a slot E in such a way as to occupy a first layer and another conductive segment present in a slot E+P in such a way as to occupy a distinct second layer and separated from the first layer by an intercalated layer comprising at least one of the conductive pins of the stator winding, P being a pitch that is predetermined in a first direction of orientation.

2. The stator according to claim 1, wherein the adjacent elbow connectors of the conductive pins are substantially parallel to the first axial end face.

3. The stator according to claim 1, wherein the loose end of a conductive segment of a pin occupying the layer in a slot is connected, near the second axial face of the annular body, to the end of a conductive segment of an adjacent pin occupying the layer in a separate slot with a pitch P.

4. The stator according to claim 1, further comprising a first type of pins so that the conductive segments, connected by an elbow connector, which near the second axial end face have their loose ends more close to each other than their conductive segments.

5. The stator according to claim 4, further comprising a second type of pins such that the conductive segments connected by an elbow connector, which near the second axial end face have their loose ends more distant from each other than their conductive segments.

6. The stator according to claim 1, wherein in two separate slots with a predetermined pitch P, conductive segments occupying one of the central layers are connected to a power source near the first axial end face of the annular body, allowing several conductive segments connected in series to be supplied with a phase current.

7. The stator according to claim 1, wherein at least one electrical terminal lug is arranged between two separate slots with a predetermined pitch P, the lug having two additional conductive segments occupying the same layer in each of these two slots and a connection part connecting these two additional conductive segments near the first axial face of the annular body.

8. The stator according to claim 7, wherein the connection part of the electrical terminal lug is radially shifted relative to the elbow connectors of the conductive pins, so that the electrical terminal lug circumvents said elbow connectors.

9. The stator according to claim 6, wherein at least one electrical connection lug is arranged between two separate slots with a predetermined pitch P, the lug having two additional conductive segments occupying a different layer in each of these two slots and a connection part connecting these two additional conductive segments near the first axial face of the annular body.

10. The stator according to claim 9, wherein the electrical terminal lug is configured so that its additional conductive segments are placed in two separate slots while being arranged in two distinct layers and separated from each other by at least one intercalated layer.

11. The stator according to claim 10, wherein the electrical terminal lug is configured so that its additional conductive segments are placed in two separate slots while being arranged in two distinct layers and separated from each other by two intercalated layers.

12. The stator according to claim 10, wherein the electrical terminal lug is configured so that its additional conductive segments are placed in two separate slots while being arranged in two distinct layers and separated from each other by at least one intercalated layer and the conductive segments connected to a power source are placed in a central layer forming the intercalated layer.

13. The stator according to claim 7, wherein the electrical terminal lug forms a serial connection between two winding portions.

14. A rotating electrical machine for automobiles comprising a stator according to claim 1.

* * * * *